United States Patent Office 3,374,100
Patented Mar. 19, 1968

3,374,100
WATER REPELLENT COMPOSITIONS
Herman B. Goldstein, Cranston, Raymond V. Kusiak, West Warwick, Raymond J. Peltier, Cranston, and Gerhard Sprenger, Ashaway, R.I., assignors to Sun Chemical Corporation, New York, N.Y., a corporation of Delaware
No Drawing. Filed Oct. 22, 1963, Ser. No. 318,066
13 Claims. (Cl. 166—2)

The present invention relates to an improved emulsion, particularly to a water repellent emulsion, and a method of making the same.

Several water repellent emulsions have been known which will impart water repellency to textile materials and fabrics.

Emulsions or dispersions have been prepared in which emulsifying or dispersing agents of numerous types have been utilized. While the stability of these emulsions is enhanced by the addition of various combinations of such agents, still, in many instances, the improvements have not been sufficiently marked so as to provide a completely satisfactory solution to the problems confronting those versed in the art.

Emulsions have been prepared, for example, using cationic emulsifiers in the presence of polyvalent metal salts and a dispersed phase consisting of a paraffin wax. Other water repellent emulsions have been prepared in which the dispersed phase comprises mixtures of paraffin wax with other waxes such as beeswax, candelilla wax, stearic acid, and the like. Also it has been known that zirconium acetate may be employed as a constituent in acidic emulsions of paraffin wax to produce water repellent emulsions. It has been found, however, that such emulsions are not generally stable to temperature changes, and, hence, tend to coagulate or separate when subjected to alternate heating and cooling periods. Moreover, many of the known water repellent emulsions have relatively short storage stability. By this, we mean that the concentrated product when stored at room temperature, gradually becomes non-dispersible, or separates into two phases which must be remixed before the product can be used by the textile mill. Likewise, many of the known water repellent compositions provide little or no water repellency on hydrophobic fibers, such as nylon, polyester fibers, cellulose acetate and polyacrylic fibers.

In addition to the above disadvantages, the known water repellent compositions are not compatible with polyvinyl acetate and when combined in the same treating bath with polyvinyl acetate and applied to textiles in a long "run," the instability of the system results in gradual build-up of material on the padder rolls which ultimately results in spotting of the cloth.

Furthermore, many of the known water repellent emulsions are very sensitive to hydrophilic colloids. For instance when hydrophilic colloids such as, hydroxyethyl starch, polyvinyl alcohol, and the like are applied to the cloth at the same time that the water repellent emulsions are applied, the mere presence of the hydrophilic colloid materially reduces the water repellency of the finish.

Therefore, it is an object of the present invention to provide an emulsion which provides excellent water repellency on all types of fiber.

It is another object of the present invention to provide an emulsion which provides excellent water repellency on hydrophobic fibers.

It is still another object of the present invention to provide an emulsion which provides excellent water repellency for hydrophobic fibers at an unusually low concentrate of applied solids.

It is still another object of the present invention to provide an emulsion having excellent shelf stability.

It is still another object of the present invention to provide an emulsion which remains homogeneous and stable for long storage periods.

It is still another object of the present invention to provide an emulsion which is compatible with hydrophilic colloids.

It is still another object of the present invention to provide an emulsion which is compatible with polyvinyl acetate, hydroxyethyl starch, polyvinyl alcohol and the like.

It is still another object of the present invention to provide an emulsion which in the presence of hydrophilic colloids will not materially reduce the water repellency of the finish.

It is still another object of the present invention to provide water repellent emulsions which are stable in the presence of polyvinyl acetate.

A still further object of the present invention is to provide water repellent emulsions which will form a stable treating bath for textiles in the presence of polyvinyl acetate and thereby prevent a gradual build-up of material on the padder rolls.

The above and other objects and advantages will be apparent from the following detailed description.

The present invention, broadly stated, relates to water repellent emulsions comprising a special amine type emulsifying agent, a polyvalent metallic salt and a dispersed phase containing a refined paraffin wax in admixture with certain saponifiable waxes.

The compositions of the present invention may vary somewhat as to their individual components, but consists broadly of an aqueous composition containing an emulsified water insoluble waxy material, amine type emulsifiers and a zirconium salt of an organic acid which on drying will form a water resistant film.

The emulsifiers of the present composition are materials that are surface active and have a relatively large number of carbon atoms. Emulsifiers which are within the contemplation of this invention are compounds of substituted aliphatic amines, acid substituted aliphatic amines, acid esters of alkanol amines, and mixtures thereof. Substituted aliphatic amines are, for example, N,N dialkyl alkylene amines, wherein the alkylene group contains from 17 to 20 carbon atoms, preferably about 18 carbon atoms and the alkyl group contains up to about 3 carbon atoms. Examples of substituted aliphatic amines are N,N dimethyl octadecyl amine, and N,N diethyl octadecyl amine. Other emulsifiers of the present invention are, for example, fatty acid amido-amines. Typical examples of such compounds are the monoacyl derivatives of N,N dialkyl alkylene diamines having from 2 to 4 carbon atoms in the alkylene group, such as ethylene, propylene and butylene diamines with organic acids having from 16 to 20 carbon atoms. Examples of the N,N dialkyl alkylene diamines are N,N dimethyl propylene diamine and N,N diethyl propylene diamine.

Also included in this invention are emulsifiers formed from acid esters of alkanol amines, preferably, fatty acid esters of N,N dialkyl alkanol amines, and, more preferably, fatty acid esters of N,N dialkyl ethanolamines. Alkanol amines which may be reacted with the organic acids are the N,N dialkyl ethanolamines, N,N dialkyl propanolamines, and dialkyl butanolamines, wherein the alkyl group contains up to 3 carbon atoms. Examples of the alkanol amines are the N,N dimethyl ethanolamines, N,N diethyl ethanol amines, N,N diethylpropanol amines, N,N dimethyl butanolamines, etc.

The acids used to form the amides and esters of the compounds of the class described are organic acids having from 16 to 20 carbon atoms such as, for example, stearic acid, palmitic acid, behenic acid and arachidic acid, preferably stearic acid.

The individual reactants chosen for making the emulsifiers should include at least one compound containing a hydrocarbon radical of substantial size, so that the emulsifier will contain at least 16 carbon atoms and preferably from 18 to 22 carbon atoms to the molecule.

The water repellent emulsions contain a dispersed phase comprising an admixture of paraffin waxes and saponifiable waxes. The waxes to which the present invention applies include especially those having carbon contents from about 16 to about 40 carbon atoms in the wax molecule. These include both hard and soft petroleum waxes of the paraffin type, as well as the microcrystalline waxes, usually having a higher number of carbon atoms per molecule. Since the invention has been found to be applicable to both paraffin waxes and microcrystalline waxes, as well as mixtures thereof, it is evident that any hydrocarbon waxes may be employed regardless of whether the carbon atoms are arranged in straight chain, branched chains or in cyclic configurations. The saponifiable waxes may contain as the waxy constituent natural or synthetic waxes as, for instance, carnauba wax, montain wax, candelilla wax, beeswax, ceresin wax, oxidized microcrystalline waxes, sugar cane wax, rice bran wax, shellac wax, oxidized Fischer-Tropsch's wax and the like. In most instances the waxy constituent comprises a true wax, such as carnauba wax or candelilla wax or mixtures thereof.

The refined paraffin waxes used in admixture with the above saponifiable waxes have American melting points ranging from between about 133° F. to about 165° F., preferably from between about 145° F. to 163° F. and containing hydrocarbon chains having from about 20 to 35 carbon atoms.

Also included in our formulation are the thermally unstable zirconium salts of organic acids such as zirconium lactate, zirconium acetate, zirconium formate, and the like, with zirconium acetate being the preferred thermally unstable salt. Other salts, such as aluminum acetate and aluminum formate and the like, though not preferred, may be present in the formulations. When utilizing zirconium acetate, it is usually convenient to use an aqueous solution of same; commercially available zirconium acetate solutions are available with $ZrO_2$ contents of about 13% to about 20%.

The emulsions are obtained by dispersing an admixture of refined paraffin waxes and saponifiable waxes in amounts of from about 10 to about 30 percent, and more preferably, from about 14 to about 24 percent, of the composition in an aqueous solution of a suitable emulsifying agent and a thermally unstable metallic salt. Aliphatic amines such as N,N-dialkyl alkylene amine, amide substituted aliphatic amines and acid esters of alkanol amines and mixtures thereof are suitable emulsifying agents and may be used in amounts of from about 0.2 to about 1.2 percent, preferably between about 0.6 to about 1.0 percent. The amount of thermally unstable metallic salts, such as zirconium acetate solution (for example, containing 13 percent $ZrO_2$) zirconium lactate, zirconium formate and the like present in the composition may range from between 3 to 25 percent and more preferably from between about 8 to about 20 percent.

In preparing the emulsion, the waxes may be melted together and mixed with a small amount of emulsifier material. The thermally unstable zirconium salts may be added with agitation. Finally, water may be added, preferably at a temperature above the melting point of the waxes until a uniform mixture is obtained. The mixture is preferably passed through a colloid mill to assure thorough homogenization and combination thereof.

Or, conversely, the molten waxes containing the emulsifier may be run into the hot aqueous solution containing zirconium salts and additional emulsifier. In preparing the emulsion, it is sometimes preferable to dissolve all of the emulsifier in the wax phase; sometimes it is preferable to dissolve all of the emulsifier in the aqueous phase; sometimes it is preferred to dissolve a portion of the emulsifier in both phases. The particular technique used will be influenced by the characteristics of the emulsifier selected.

In the case of treating fabrics, leather or paper with the emulsion, water may be added in sufficient amount until the water insoluble material constitutes less than 10% and preferably less than 8% of the final emulsion. For example, from 5 to 10 parts of the concentrated emulsion may be added to several hundred parts of water in which cloth or leather, etc. may be immersed for "exhaustion" application. Also from 5 to 10 parts of the emulsion may be diluted with 100 parts of water for padding, brushing, or dipping application.

When textiles, such as fabrics and yarns, whether of cotton, wool, linen, nylon, and so forth, are treated with the dilute emulsion for "exhaustion" application the fabrics are dipped in the bath and permitted to remain therein with or without agitation for a period of from about 5 up to about 60 minutes, or until the water repellent exhausts onto the item being treated.

The coarse emulsions may be further dispersed by passage through a jet type homogenizer, which is operating upwards in the range of about 4,000 pounds pressure. However, a rotating disc or other suitable sonic type homogenizer may be employed in place of the jet type high pressure homogenizer.

The following examples are illustrative of the practice of our invention, but it is to be understood that the invention is not to be limited to these examples. All parts listed are by weight.

EXAMPLE I

| | |
|---|---|
| Paraffin wax (146–155° F., AMP) | 155 |
| Candelilla wax | 39 |
| Warchem No. 1 | 4 |
| Water | 624 |
| Acetic acid (80%) | 17 |
| Warchem (194–5) | 4 |
| Zirconium acetate solution (13% $ZrO_2$) | 155 |

Warchem 1—Stearic acid esters of N,N-diethyl ethanolamine.

Warchem 194–5—Stearic acid amide of N,N-dimethyl propylene diamine.

The emulsion is prepared by melting 155 parts of a paraffin wax having a melting point of 146°–155° F. and 39 parts of candelilla wax together and then adding 4 parts of Warchem 1 to the melted wax. An aqueous solution is prepared by dissolving 155 parts of zirconium acetate solution and 4 parts of Warchem 194–5 in 495 parts of water. The solution was heated to about 75° C. and then the paraffin wax mixture was added to the aqueous solution while agitating vigorously. The mixture was emulsified by passage through a jet type homogenizer operating at about 4,000 pounds presure. The resulting emulsion was cooled with agitation prior to the addition of the remaining 229 parts of water.

Various fabric such as cotton fabrics, woolen fabrics, nylon fabrics, etc. were impregnated with a solution consisting of approximately 5 grams of the product of this example and 95 grams of water and then dried. All the fabrics were found to have a 100 spray rating as determined by the AATCC Test Method 22–1961, as described in the AATCC Technical manual, 162. Furthermore, the woolen fabrics, and fabrics composed of synthetic hydrophobic fibers were found to have water repellency which persisted even after laundering.

A padding solution was prepared containing 5 percent of a conventional nonionic polyvinylacetate emulsion and 8 percent of the product of this example. A stable padding bath was obtained, and no troubles with pad-roll build-up or spotting of the fabric was encountered even after as much as 50,000 yards of fabric has been processed through the solution. This was an extremely unusual effect because all hitherto known water repellent emulsions cause pad-roll build-up and spotting troubles with such long runs in a textile mill.

Likewise, a padding solution was prepared containing 3 percent hydroxyethyl starch and 8 percent of the product of this example. Cotton cloth was impregnated with the solution and found to have a spray rating of between 90 and 100. This also was extremely surprising in view of the fact that all known water repellent emulsions would not provide this high level of water repellency when combined with such a high concentration of hydrophilic colloid.

EXAMPLE II

| | |
|---|---|
| Paraffin wax (146–155° F., AMP) | 310 |
| Candelilla wax | 78 |
| Warchem No. 1 | 8 |
| Warchem (194–5) | 8 |
| Zirconium acetate 19.5% $ZrO_2$ | 207 |
| Water | 389 |

Warchem No. 1—Stearic acid ester of N,N diethyl ethanolamine.
Warchem (194–5)—Stearic acid amide of N,N dimethyl propylene diamine.

The product was prepared in the same manner as for Example I. This highly concnertated emulsion may be used for conventional application in a textile mill. In addition, because of its high concentration and extreme effectiveness, it was also of value for the application in home laundries. For example, if 30 grams of the product of this example were dispersed in the water in the final rinse of a home-washing cycle, as much as 4 or 5 pounds of clothing may be rendered water repellent with this small concentration of product.

EXAMPLE III

| | |
|---|---|
| Paraffin wax (146–155° F., AMP) | 160 |
| Beeswax | 60 |
| Stearic acid ester of N,N diethyl ethanolamine | 4 |
| Acetic acid (80%) | 17 |
| Stearic acid amide of N,N dimethyl propylene diamine | 4 |
| Zirconium acetate solution 13.0% $ZrO_2$ | 100 |
| Water | 655 |

The product was prepared in the same manner as for Example I.

EXAMPLE IV

| | |
|---|---|
| Paraffin, ref. (133–135° F., AMP) | 125 |
| Shellac wax | 45 |
| Dimethyloctadecylamine | 4 |
| Acetic acid (80%) | 20 |
| Zirconium acetate solution 19% $ZrO_2$ | 140 |
| Water | 666 |

The product was prepared in the same manner as for Example I. Equally satisfactory results were obtained when all the dimethyl octadecylamine was dissolved with the waxes, or when it was all dissolved in the aqueous phase, or when it was divided and part was dissolved in the wax and part in the aqueous phase.

EXAMPLE V

| | |
|---|---|
| Paraffin, ref., 145–153° F., AMP | 150 |
| Refined montan wax | 50 |
| Acetic acid (80%) | 15 |
| Zirconium acetate solution 13.5% $ZrO_2$ | 180 |
| Stearic acid amide of N,N dimethyl propylene diamine | 8 |
| Water | 597 |

This product may be prepared essentially as described in Example I. The tertiary amido amine may be dissolved in the water phase, or in the wax phase, or it may be divided and a part dissolved in each with equally satisfactory results.

Although the present invention is particularly applicable to the impregnation and especially the waterproofing of textile materials, it is also broadly applicable to the treatment of cellulose materials such as paper and paper pulp, furs, leather and skins and the like.

Even though the emulsion is preferably utilized for waterproofing textiles in the form of fibers or yarns, it may also be utilized for softening, sizing, lustering and otherwise finishing materials or incorporating loading materials therein.

These emulsions are all very stable in the concentrated form in which they are prepared. The non-aqueous content of these concentrated emulsions average usually substantially above 20 percent.

The emulsions described heretofore will remain unchanged even after they have been kept for days at temperatures substantially below 32° F. At high temperatures of about 100° F. for example, these emulsions will remain completely stable as contrasted to the more widely known emulsions. It is obvious therefore that one of the advantages of the present invention resides in the fact that the emulsions produced will remain in stable condition over widely varying temperature conditions for long periods of time. This is a primary requisite in commercial practice since these emulsions may be held in storage for weeks or months, and they should not have undergone any change during this period.

A most unusual feature of this invention resides in the fact that the emulsions of this invention may be combined with a conventional nonionic polyvinylacetate emulsion to provide a stable padding bath. No problems were encountered even after as much as 50,000 yards of fabric had been processed through the solution. This is extremely unusual because all heretofore known water repellent emulsions cause pad-roll build-up and spotting troubles with such long runs in a textile mill.

Another surprising and unusual feature of this invention resides in the fact that the emulsion of the present invention may be combined with hydroxyethyl starch or other hydrophilic colloids in a padding bath. A cotton cloth treated therewith exhibited a spray rating of between 90 and 100. This was a surprising and unexpected result because all known water repellent emulsions, when combined with a high concentration of hydrophilic colloid will not provide this high level of water repellency.

We claim:

1. An aqueous water repellent emulsion for application to fibrous material comprising an emulsion of from 10 to 28 percent wax, an emulsifying agent selected from at least one member of the group consisting of (a) N,N dialkyl alkylene amines, (b) fatty acid amides of N,N dialkyl alkylene diamines, (c) fatty acid esters of N,N dialkyl alkanolamines and mixtures thereof wherein the alkyl group contains from 1 to 3 carbon atoms per alkyl group and a thermally unstable zirconium salt.

2. An aqueous water repellent emulsion as defined in claim 1 wherein the dispersed phase is an admixture of waxes.

3. An aqueous water repellent emulsion as defined in claim 2 wherein the dispersed phase is an admixture of refined paraffin waxes and saponifiable waxes.

4. An aqueous water repellent emulsion as defined in claim 3 wherein the paraffin waxes have a melting point of between 130 and 165° F., AMP.

5. An aqueous water repellent emulsion as defined in claim 1 wherein the thermally unstable salt is zirconium acetate.

6. An aqueous water repellent emulsion as defined in claim 2 wherein the thermally unstable salt is zirconium acetate.

7. An aqueous water repellent emulsion as defined in claim 1 wherein the alkylene radical of N,N dialkyl alkylene amines contains 18 carbon atoms.

8. An aqueous water repellent emulsion as defined in claim 1 wherein the alkylene radical of the acid amides of N,N dialkyl alkylene diamines contains between 2 and 4 carbon atoms.

9. An aqueous water repellent emulsion as defined in claim 1 wherein the fatty acids contain from 16 to 20 carbon atoms.

10. An aqueous water repellent emulsion as defined in claim 1 wherein the alkanol group contains from 2 to 4 carbon atoms.

11. An aqueous water repellent emulsion for application to fibrous material comprising an emulsion of an admixture of from 10 to 20 percent of a refined paraffin wax, 0.5 to 8 percent of a saponifiable wax, and 0.2 to 1.2 percent of an emulsifying agent selected from at least one member of the group consisting of (a) N,N dialkyl alkylene amines, (b) fatty acid amides of N,N dialkyl alkylene diamines, (c) fatty acid esters of N,N dialkyl alkanol amines and mixtures thereof wherein the alkyl group contains from 1 to 3 carbon atoms per alkyl group and from 3 to 25 percent of zirconium acetate solution.

12. An aqueous water repellent emulsion for application to fibrous material comprising a colloidal suspension of an admixture of 16 percent of a refined paraffin wax, 6 percent of beeswax, an emulsifying agent containing a mixture of 0.4 percent of stearic acid ester of N,N diethyl ethanolamine, 0.4 percent of stearic acid amide of N,N dimethyl propylene diamine and 10 percent of a zirconium acetate solution.

13. A process of waterproofing a fiber which comprises coating the fiber with an aqueous emulsion comprising a colloidal suspension of an admixture of from 10 to 20 percent refined paraffin wax, 0.5 to 8 percent of a saponifiable wax, 0.2 to 1.2 percent of an emulsifying agent selected from at least one member of the group consisting of (a) N,N dialkyl alkylene amines, (b) fatty acid amides of N,N dialkyl alkylene diamines, (c) fatty acid esters of N,N dialkyl alkanolamines and mixtures thereof wherein the alkyl group contains from 1 to 3 carbon atoms per alkyl group and from 3 to 25 percent of a thermally unstable metallic salt solution and thereafter drying the fiber to produce on the fibers a thin coating having quick drying and non-tacky properties.

References Cited
UNITED STATES PATENTS

| | | | |
|---|---|---|---|
| 2,635,055 | 4/1953 | Figdor | 106—271 |
| 2,737,458 | 3/1956 | Burham | 106—271 X |
| 2,759,851 | 8/1956 | Fluck et al. | 106—271 X |
| 2,907,681 | 10/1959 | Dunbar et al. | 106—271 X |

ALEXANDER H. BRODMERKEL, *Primary Examiner.*

SAMUEL H. BLECH, *Examiner.*

J. B. EVANS, *Assistant Examiner.*